United States Patent

[11] 3,578,827

| [72] | Inventor | Joseph E. Smith<br>Torrance, Calif. |
|---|---|---|
| [21] | Appl. No. | 800,488 |
| [22] | Filed | Feb. 19, 1969 |
| [45] | Patented | May 18, 1971 |
| [73] | Assignee | Excellon Industries<br>Torrance, Calif. |

[54] ARRANGEMENT FOR PROVIDING PRECISE MOVEMENT
19 Claims, 14 Drawing Figs.

[52] U.S. Cl. ................................................. 308/5
[51] Int. Cl. ................................................. F16c 17/00
[50] Field of Search ........................................ 308/5, 9, 72, 3, 3 (A), 73, 160

[56] References Cited
UNITED STATES PATENTS

| 3,508,430 | 4/1970 | Edmondson .................. | 308/5 |
| 1,666,521 | 4/1928 | Allen ........................... | 308/160 |
| 1,814,833 | 7/1931 | Doran .......................... | 308/73 |
| 3,389,625 | 5/1968 | Wagner ........................ | 308/3(A) |
| 3,432,213 | 3/1969 | Adams ......................... | 308/5 |

Primary Examiner—Mark M. Newman
Assistant Examiner—Randall Heald
Attorney—Gausewitz & Carr

ABSTRACT: This arrangement for providing precision motion includes two relatively movable members, one of which is provided with a surface accurately defining a predetermined path, opposite which is a surface approximately parallel to the first, but not made to the same close tolerances so that some deviations exist. Air bearings are held adjacent these surfaces with ball-and-socket mountings to allow universal movement of the bearings. The bearings adjacent the irregular surface are held by a resilient means, which allows them to move when inaccuracies are encountered.

PATENTED MAY 18 1971

INVENTOR.
JOSEPH E. SMITH
BY
*Jacobwitz & Carr*
ATTORNEYS

INVENTOR.
JOSEPH E. SMITH
BY
ATTORNEYS

INVENTOR.
JOSEPH E. SMITH

ATTORNEYS

INVENTOR.
JOSEPH E. SMITH
BY
ATTORNEYS

INVENTOR.
JOSEPH E. SMITH

BY

ATTORNEYS

ARRANGEMENT FOR PROVIDING PRECISE MOVEMENT

BACKGROUND OF THE INVENTION

1. Field of the Invention

This invention pertains to an arrangement for guiding a movable member in a predetermined path.

2. The Prior Art

For certain purposes, there is a need for providing a movable part which must traverse an extremely accurately defined path. This may occur in machine tools, for example, where an element should be guided along an established path with practically no deviation permitted to allow accurate cutting or forming of a workpiece. If this can be done, better products can be produced and laborious and expensive handwork avoided. In the past, however, there has existed no fully satisfactory means for accomplishing precision movement of this type. It has been impossible to provide ways or other guiding means which will confine a movable member to an extreme degree of accuracy while allowing an amount of linear movement adequate for many purposes. One reason for the difficulty lies in the problem of providing a member with opposite sides that are both straight and parallel for engagement by the opposed surfaces of the ways or other guide bearings. Inevitably, deviations occur, so that the two critical surfaces lack parallelism. This has meant that it has been extremely expensive to produce any precision guiding arrangement in view of the difficulty in attempting to provide the opposite surfaces with exact straight and parallel contours. The inability to do more than approach accurate forming of the surfaces has meant that the results have provided less than the desired precision. Also, the path within which reasonably accurate movement has been provided has been very limited in length. Beyond this, tolerances build up and the needed precision is lost.

SUMMARY OF THE INVENTION

The present invention provides an improved guiding arrangement which has much better accuracy than previous designs and allows long travel of the movable member, yet which is of a relatively simple and low-cost construction. One of the members of the unit, which may be either movable or stationary, is provided with a single accurately held surface. The opposite surface only approximates the path of the first and need not be entirely straight nor parallel to the first surface. This avoids entirely the problem of obtaining parallelism in opposed surfaces on a part. The two surfaces are engaged by air bearings to provide a virtually friction-free support and guide. The air bearing adjacent the accurate surface is adjustable, but is fixed during the time the relative motion takes place. The opposite air bearing adjacent the inaccurate surface is spring loaded. A ball-and-socket joint is used to assure that the bearings are automatically aligned with their adjacent surfaces. As the movement takes place, the line of motion is determined by the accurately formed surface, which causes the movable member to travel a closely defined path. On the opposite and inaccurate surface, the bearing that is spring loaded may move in and out and angularly as it encounters irregularities in the surface so that, while it helps hold the movable member against the bearing at the accurately formed surface, it at the same time accommodates the inaccuracies of the other surface.

In a typical design, there are two bearings positioned adjacent the accurate surface, each of which is recessed on its backside to receive a ball. The other side of each ball is engaged by the socket end of a screw that is held in a structural element. This allows adjusting the positions of the bearings toward or away from the accurate surface of the member. On the opposite side adjacent the inaccurate surface is another pair of bearings, also provided with ball-and-socket joints on their outer surfaces. A bar, recessed to receive the balls, interconnects the two bearings on the side of the inaccurate surface. A spring is included that allows the two bearings to move independently, this spring being either found in the resilience of the bar extending between the two bearings, or provided as a separate element where a rigid bar is used. The angularity of the movable portion relative to the stationary portion may be adjusted by rotation of the screws for the bearings at the accurate surface. By adjusting one toward the member and the other away, the member can be caused to rotate. This angular movement is accommodated by the spring mounting arrangement for the bearings on the opposite side of the member.

Various combinations are possible, such as where one assembly is guided by a beam and incorporates a second beam providing for motion in a direction substantially at 90° relative to the first beam.

The invention may be incorporated in a machine in which a granite beam is supported in air bearing assemblies at two opposite ends, adjustable to permit the angularity of the side surfaces of the beam to be controlled. Carried by the beam may be a plurality of drills which are advanced incrementally to form openings in printed circuit boards or other parts.

In another version, the invention may be used for guiding rotary parts to provide accurate rotational movement.

An object of this invention is to provide an improved means for providing for accurate movement in a predetermined path.

Another object of this invention is to provide for movement of improved accuracy and through a relatively long distance.

A further object of this invention is to provide for accurate movement with a machine that is of relatively simple construction and made at a relatively low cost.

A still further object of this invention is to provide an improved arrangement for air bearings that will support a high load with minimal flow of air.

An additional object of this invention is to provide a drilling machine arranged to move one or more drills in an accurately defined path.

These and other objects will become apparent from the following detailed description taken in connection with the accompanying drawing.

DESCRIPTION OF THE PREFERRED EMBODIMENTS

Figure 1:
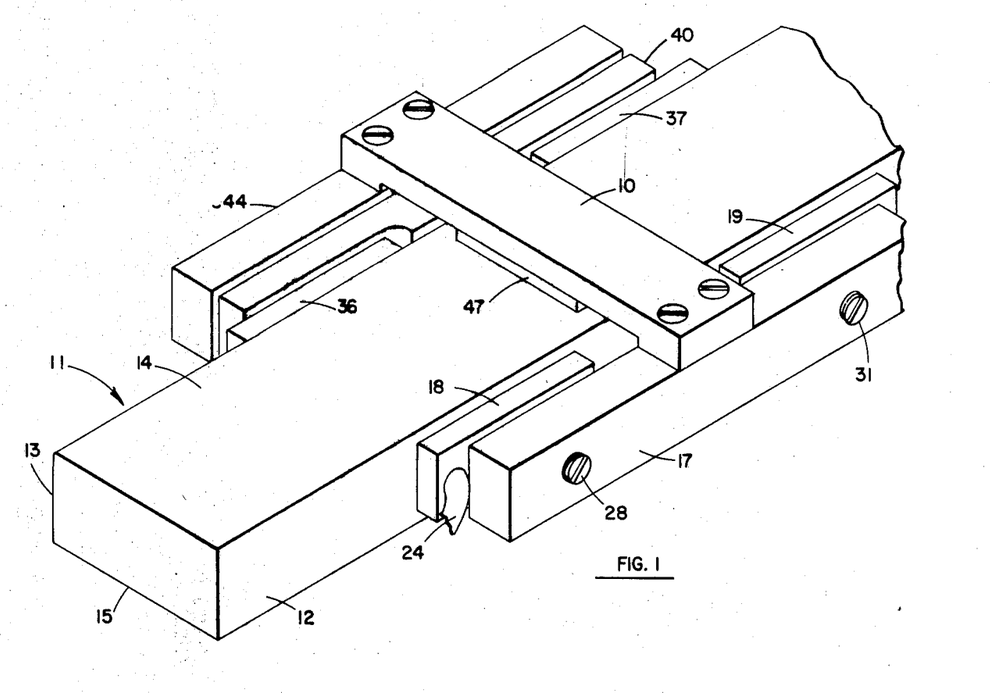
FIG. 1 is a perspective view of a device utilizing the invention.
Figure 2:
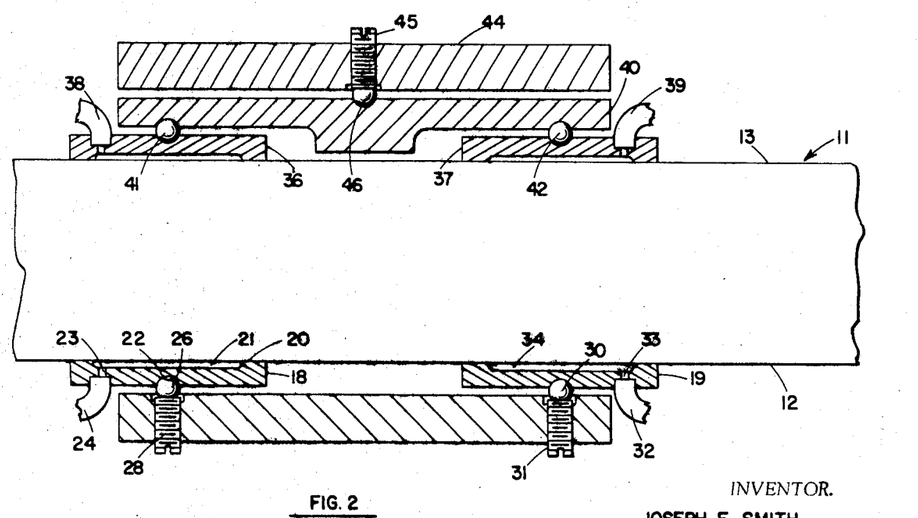
FIG. 2 is a longitudinal sectional view taken along line 2-2 of FIG. 1.
Figure 3:
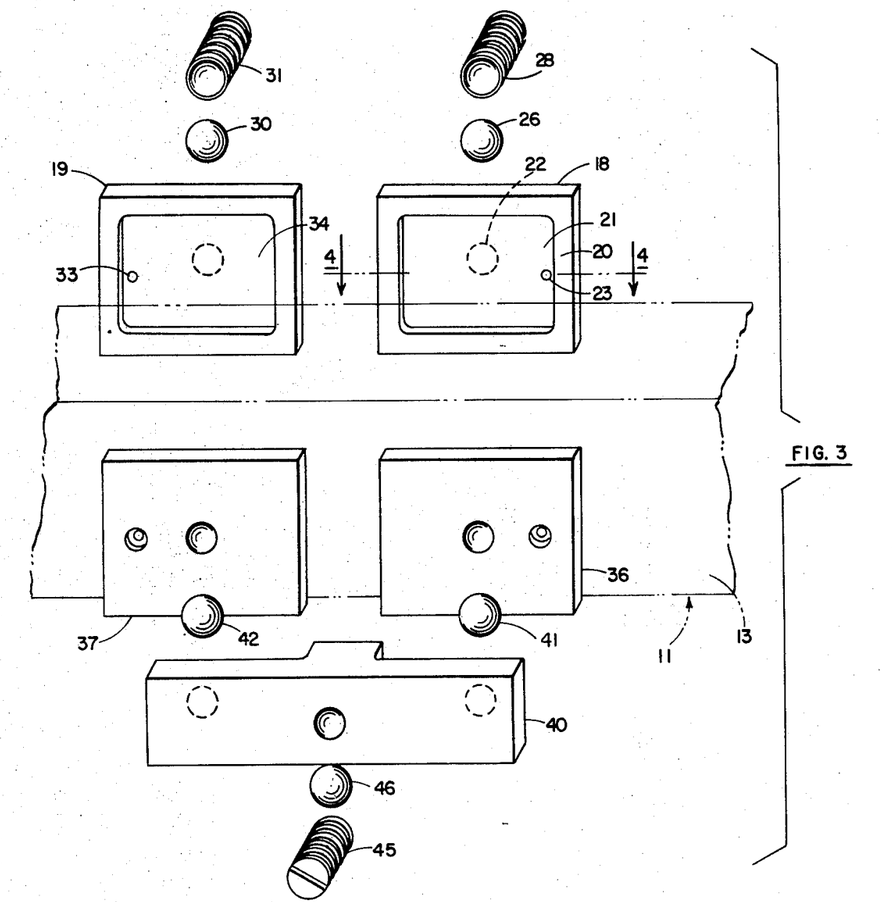
FIG. 3 is an exploded perspective view of the air bearings and associated elements.

As illustrated in FIGS. 1, 2 and 3 of the drawing, the arrangement of this invention is utilized in providing accurate rectilinear motion of a plate 10. The latter member may be used as a support for any auxiliary device which requires precision movement. The plate 10 moves longitudinally of a beam 11, which typically is made of granite to provide a stable contour. The beam 11 is rectangular in cross section, having sidewalls 12 and 13 and top and bottom walls 14 and 15, respectively. The side surface 12 is machined to considerable accuracy so that it is made to fall within one plane. The other surface 13, however, is not formed within the same close tolerances as those of surface 12. In other words, the surface 13 may possess irregularities, being only approximately straight and parallel to the surface 12, varying from such condition within the range of normal manufacturing tolerances.

Attached to one end of the member 10 is a rigid bar 17 which is spaced outwardly from the side beam surface 12. Intermediate the ends of the bar 17 and the surface 12 of the beam 11 are air bearings 18 and 19, which are of similar construction. The bearing 18, as shown in particular in FIGS. 3 and 4, includes a flat surface 20 around the perimeter of one side of the bearing, inwardly of which is a shallow recess 21. On the opposite side of the bearing is a central recess 22 defined by a segment of a sphere that is less than a hemisphere. A passageway 23 extends through the bearing, communicating with the recess 21. An air line 24 is connected to the passageway 23.

Figure 4:
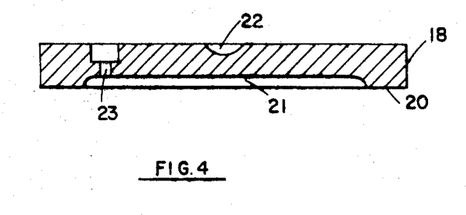
FIG. 4 is a sectional view of one of the air bearings, taken along line 4-4 of FIG. 3.

In use of the bearing 18, therefore, it is positioned with the surface 20 adjacent the surface 12 of the beam 11. Air is introduced through the line 24 and the passageway 24 into the zone of the recess 21. This air may escape from the bearing through a narrow gap between the surface 20 of the bearing and the surface 12 of the beam. This provides a film of air and an almost friction-free relationship between the bearing 18 and the side of the beam 11. At the same time, the flow of air is slow so that the bearing uses only a small volume of air.

A ball 26 fits complementarily in the recess 22 in the backside of the bearing 18. This ball is engaged by the forward end of a screw 28 which is threaded into an aperture extending through the bar 17. This positions the screw 28 normal to the surface 12 of the beam 11. A recess is provided in the end of the screw 28, which is complementary to the ball 26. Hence, there is a ball-and-socket joint at the screw 28 and at the bearing 18. This allows universal movement of the bearing 18 relative to the bar 17.

The arrangement for the bearing 19 is the same as that provided for the bearing 18. A ball-and-socket type universal joint is provided, where a ball 30 fits in a recess in the outer side of the bearing 19 and in a similar recess in the end of a screw 31 that extends through the bar 17. An air line 32 connects to a passageway 33 extending through the bearing 19 to a shallow recess 34.

On the opposite side of the beam 11, bearings 36 and 37 are provided adjacent the side surface 13. These bearings, which are provided with air inlet lines 38 and 39, are similar to the bearings 18 and 19. Outwardly of the bearings 36 and 37 is a bar 40 recessed near its ends to complementarily receive balls 41 and 42, which similarly engage recesses in the outer surfaces of the bearings 36 and 37, respectively. The outer end portions of the bar 40 adjacent the bearings 36 and 37 are of reduced thickness and possess resilience. Therefore, the end portions of the beam 40 are, in effect, leaf springs.

A rigid bar 44 is secured to the undersurface of one end of the plate 10 and located outwardly of the resilient bar 40. A screw 45 extends through a threaded opening in the rigid bar 44, and is perpendicular to the side surface 13 of the beam. The screw 45 has a recessed end complimentarily receiving a ball 46. There is also a recess in the outer central portion of the resilient bar 40 into which the ball 46 complementarily fits. Thus, a universal joint is provided between the rigid bar 44 and the resilient bar 40. The screw 45 is adjusted toward the beam in an amount sufficient to preload the resilient bar inwardly.

In order to withstand the weight of the assembly, an additional bearing 47 is provided between the undersurface of the plate 10 and the upper surface 14 of the beam 11. This also is an air bearing.

When the plate 10 is moved along the path defined by the beam 11, it is guided in a precise straight line as determined by the contour of the accurately formed side 12 of the beam. The air bearings 18 and 19 automatically are aligned with the beam surface 12 by virtue of their ball-and-socket joint connections to the rigid bar 17. On the opposite side of the beam, the bearings 36 and 37 ride along the irregular contour of the surface 13. When deviations are encountered, the spring provided by the resilient bar 40 merely deflects, allowing the bearings 36 and 37 to move as required. The ball-and-socket joints between the resilient bar 40 and the air bearings 36 and 37 allow relative angularity in any direction between these connected elements. Also, the ball-and-socket joint between the resilient bar 40 and the rigid bar 44 outwardly of it permits the resilient bar to move as it is deflected. Thus, while one side of the assembly is adjacent an irregular surface and the bearings are allowed to move during the operation of the device, the opposite side is held firmly against the accurately formed surface 12 and guides the plate 10 in a precise path.

Figure 5:
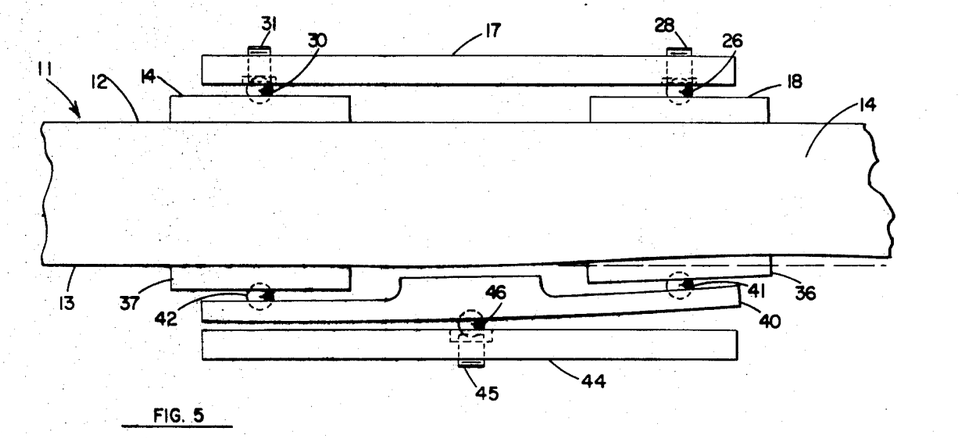
FIGS. 5 and 6 are schematic plan views illustrating the movement of the bearings on one side of the beam in following irregularities.
Figure 6:
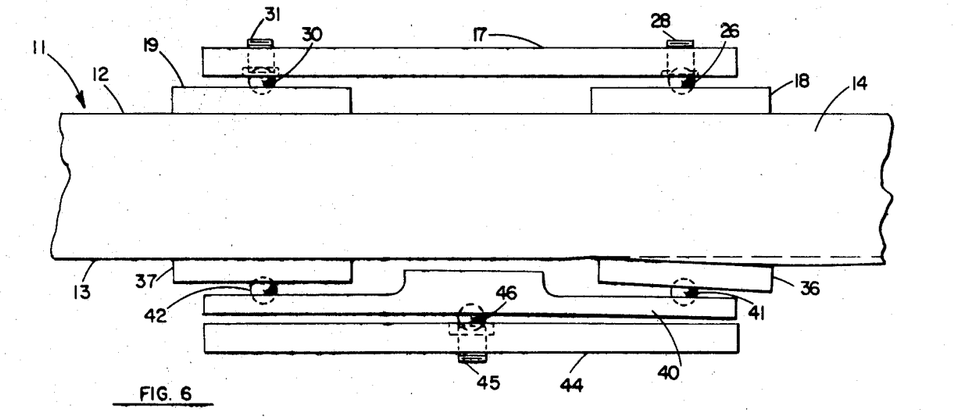
Figure 7:
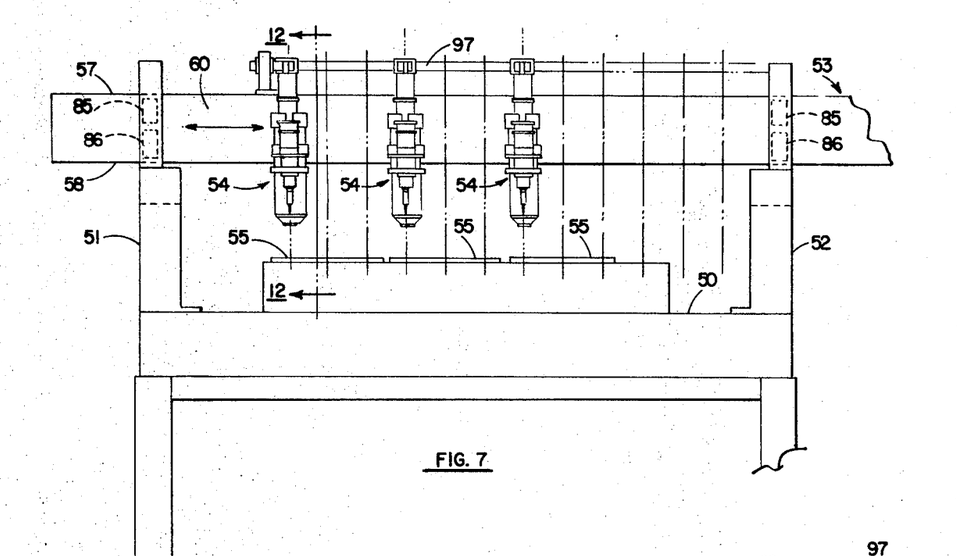
FIG. 7 is a front elevational view of the invention utilized in a drilling machine.
Figure 8:
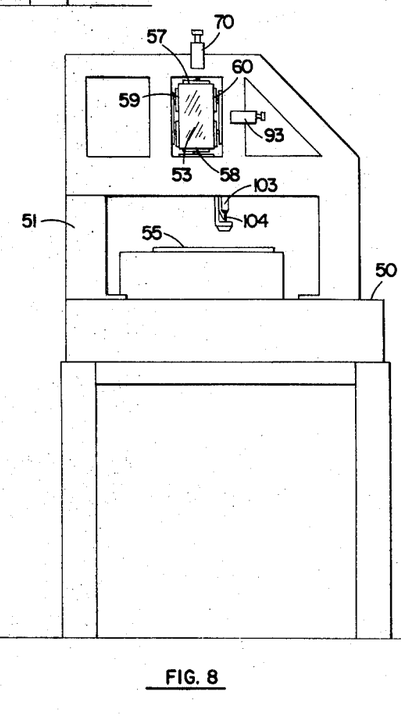
FIG. 8 is an end elevational view of the machine of FIG. 7.

The effect of the unit in allowing the motion of the bearings along the irregular beam surface 13, while maintaining proper contact along the straight surface 12, is shown in schematic and considerably exaggerated form in FIGS. 5 and 6. In FIG. 5, it may be seen that the bearing 37 has encountered an inwardly recessed portion in the side 13 of the beam 11. The bearing 37 merely follows the contour of the beam into the recessed portion, while the preloaded resilient bar 40 deflects inwardly at that end. Conversely, when a protuberance is encountered, as indicated in FIG. 6, the end of the resilient bar 40 adjacent the bearing that is affected is deflected outwardly. The ball-and-socket joints allow the deflection of the resilient bar 40 and permit the air bearings 36 and 37 to move angularly as the irregularities are engaged. Irrespective of this, the plate 10 is maintained in the straight path defined by the beam surface 12.

The provision of the screws 28, 31 and 45 outwardly of the bearings 18, 19, 36 and 37 allows adjustment of the clearance between the bearings and the sides of the beam 11. By rotating the screws to move them axially inwardly or outwardly with respect to the beam, the clearance between the bearings and the beam may be decreased or increased as desired. Therefore, the bearings may be set so that a proper amount of air flows across the marginal portions of the bearings to provide a virtually friction-free relationship while minimizing the air flow and avoiding excess air loss.

The screw mountings for the bearings also allow the angularity of the plate 10 to be adjusted. As the device is shown in FIG. 1, rotation to advance the screw 31 and to retract the screw 28 will cause the end of the bar 17 that receives the screw 31 to move outwardly, while the other end of the bar 17 will move inwardly toward the surface 12. As a result, the plate 10 will be rotated in a clockwise direction. Conversely, advancing the screw 28 and retracting the screw 31 will produce counterclockwise rotation of the plate 10. The angularity is taken up on the opposite side of the machine by the flexible bar 40, which merely bends as the angular adjustment is made. This rotational adjustment of the plate 10 may be important where a part is carried by the plate 10 which must have a particular angular relationship with the side 12 of the beam 11.

In some instances, the plate 10 may serve as an item comparable to the beam 11, being engaged by another air bearing assembly which thereby is permitted to move transversely of the beam 11. In that event, one side of the plate 10 will be precision formed, while the other side need not be exactly parallel to the first nor entirely straight. The path of movement of the assembly moving along the plate 10 may be made either precisely perpendicular to the side 12 of the beam 11 or a desired deviation from such relationship may be obtained by adjustment of the screws 28 and 31.

While described above as having the beam 11 stationary and the other elements movable along it, this arrangement may be reversed, with the beam 11 serving as the movable element.

As illustrated in FIGS. 9 through 12, the invention is applied to a drilling machine. This machine includes a bed 50 at the ends of which are support frames 51 and 52, which carry a beam 53 that is movable longitudinally of the bed 50. Several drill assemblies 54 are carried by the beam 53 and are moved in a precise straight line as the beam 53 is advanced for drilling spaced openings in the workpieces 55 beneath the drills.

Figure 9:
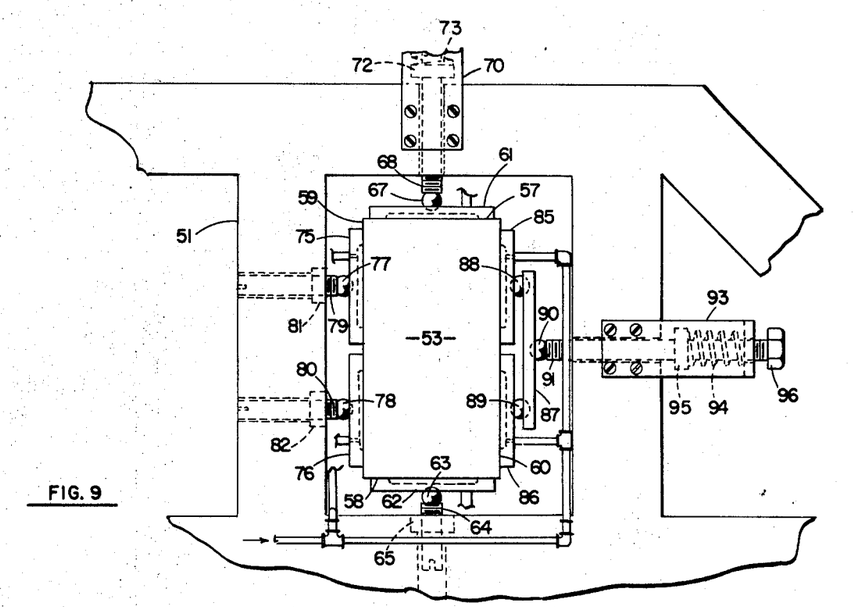
FIG. 9 is an enlarged fragmentary end elevation of the machine, illustrating the bearing support.
Figure 10:
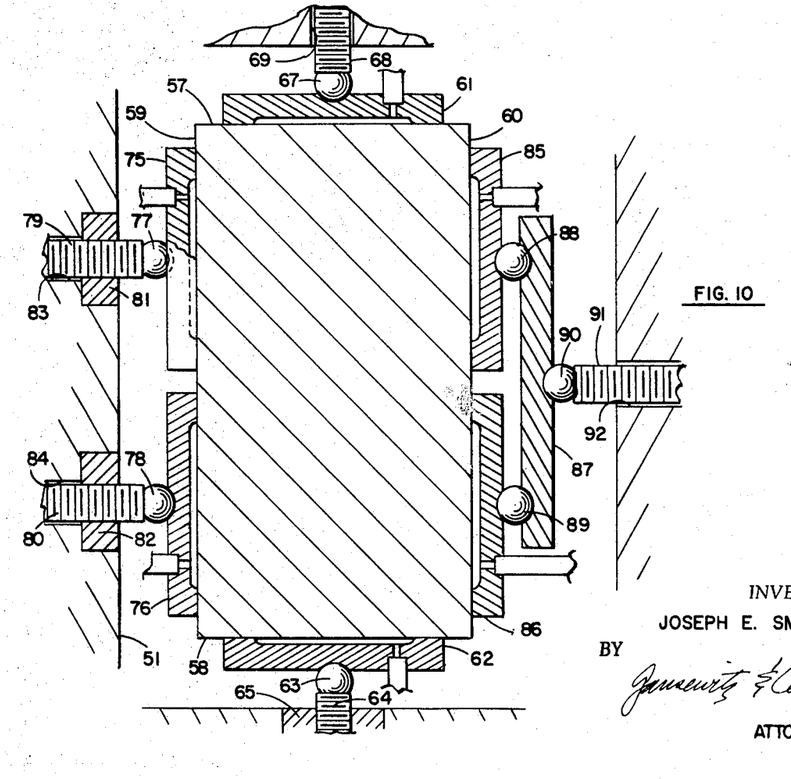
FIG. 10 is an enlarged transverse sectional view taken along line 10-10 of FIG. 7.
Figure 11:
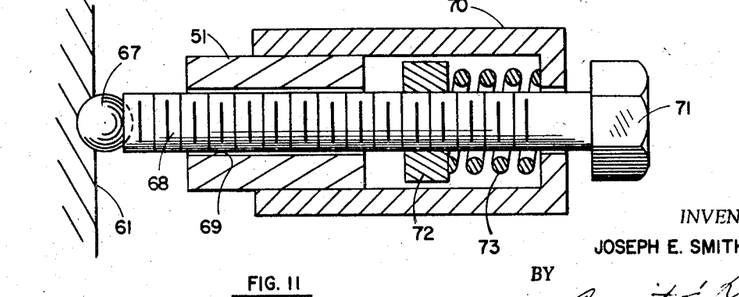
FIG. 11 is an enlarged sectional view illustrating the spring mounting for one of the bearings.
Figure 12:
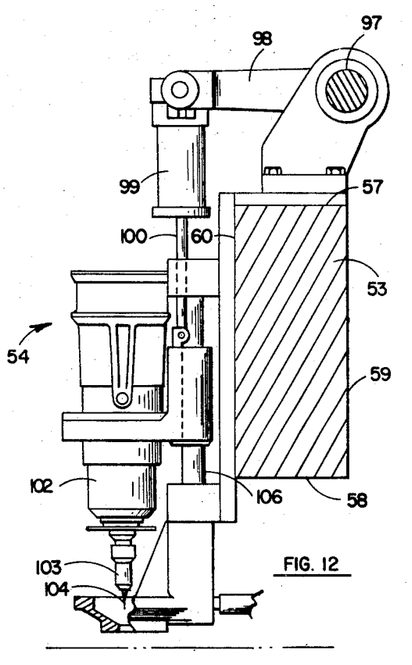
FIG. 12 is a transverse sectional view taken along line 12-12 of FIG. 7.

The beam 53 includes upper and lower horizontal surfaces 57 and 58, respectively, and side surfaces 59 and 60. At either of the end frame supports 51 and 52, the beam 53 is engaged by an upper bearing 61 and a lower bearing 62, as best seen in FIGS. 9 and 10. These bearings are similar to the air bearings described above relative to the embodiment of FIGS. 1, 2 and 3. There is a ball 63 received in a socket formed in the outer side of the lower bearing 62 and also in the end of a screw 64. The latter member is threadably received in a nut 65 that is held stationary relative to the framework of the machine. Another ball 67 engages the outer surface of the upper bearing 61 as well as the end of a screw 68. The latter member extends slidably through an unthreaded opening 69 in the framework and through a cage 70, terminating in a head 71 exteriorly of the cage 70 (see FIG. 11). A nut 72 is received on the screw 68 within the cage 70 and engaged by a compression spring 73 that bears also against the outer end wall of the cage 70. Therefore, the force of the spring 73, acting through the screw 68, maintains the bearing 61 adjacent the upper surface 57 of the beam 53.

By this construction, in order to maintain the beam 53 in a precisely horizontal plane throughout its movement, only the bottom surface 58 need be formed so it is flat and straight. The upper surface 57 may be irregular and out of parallelism with the bottom surface 58, but this will be compensated for during movement of the beam 53 by the movement of the screw 68 as permitted by the compression spring 73.

At either end of the beam 53, the side surface 59 of the beam is engaged by a pair of bearings 75 and 76 arranged one above the other. Again, these are air bearings of the type described above. Balls 77 and 78 extend into sockets in the outer sides of the bearings 75 and 76, and into sockets in the ends of screws 79 and 80. The latter members extend through nuts 81 and 82, which are fixed relative to the frame of the machine. Outwardly of the nuts, the screws extend into clearance openings 83 and 84 that extend through the framework and provide access to the outer ends of the screws.

On the opposite side of the beam 53, and at either end of it, are two air bearings 85 and 86 arranged in vertical alignment, similar to the positioning of the bearings 75 and 76. A rigid bar 87 is positioned outwardly of the bearings 85 and 86 and recessed to receive balls 88 and 89. The latter members also are received in recesses in the outer surfaces of the bearings 85 and 86. At the central portion of the rigid bar 87, a ball 90 is received in a recess in the bar and also in the end of a screw 91. The latter member slidably extends through an opening 92 in the framework and into a cage 93 that is similar to the cage 70 described above. Within the cage 93 is a compression spring 94 that bears against a nut 95 on the screw 91 as well as on the outer wall of the cage. The head 96 of the screw 91 is exteriorly of the cage 93. Therefore, the compression spring 94 presses the screw 91 inwardly so that the ball 90 pushes against the bar 87 which, in turn, through the balls 88 and 89, holds the bearings 85 and 86 against the side surface 60 of the beam 53.

In this arrangement, the side surface 59 of the beam is accurately formed, but the opposite side surface 60 need not be straight nor parallel to the surface 59. The beam is guided throughout its movement by the contour of the surface 59, while the bearings 85 and 86 may be deflected inwardly or outwardly by any irregularities encountered along the surface 60 of the beam 53. Each of the bearings 85 and 86 may move inwardly or outwardly by virtue of its ball-and-socket connection to the bar 87, which, in turn, has a similar connection to the end of the screw 91. Moreover, the entire bearing assembly along the surface 60 may move inwardly or outwardly because of the takeup permitted by the compression spring 94. The action, therefore, is similar to that described above for the beam 11. However, in place of using a resilient bar, such as the bar 40, in connecting the two bearings on the irregular side, in the embodiment of FIGS. 9 through 12, the interconnecting bar is rigid and the necessary resilience is provided by a compression spring that engages the rigid bar. The results of the two systems are equivalent.

Various adjustments are made possible by the arrangement of the embodiment of FIGS. 9 through 12. The beam may be positioned so that the side surface 59 is precisely in a vertical plane, or at an angle relative thereto. This is accomplished through manipulation of the screws 79 and 80 that control the positions of the bearings 75 and 76. To turn the screws 79 so as to advance them axially inwardly, while backing off the screws 80, causes the beam surface 59 to rotate in a clockwise direction as the device is viewed in FIGS. 9 and 10. Conversely, of course, outward movement of the screws 79, and inward movement of the screws 80, causes the surface 59 to rotate in the counterclockwise direction. As such adjustment takes place, the ball-and-socket mountings for the bearings 85 and 86, and for the bars 87, as well as the springs 94, will compensate for the change in angular position of the beam 53. Also, either end of the beam may be moved laterally to the right or to the left by simultaneous adjustment of the screws 79 and 80 inwardly or outwardly. An additional adjustment is provided by the screw mountings for the bearings 62 along the lower surface 58 of the beam 53. Raising or lowering of either screw 64 will raise or lower the end of the beam where the adjustment is made. Consequently, there is versatility in the movement of the beam through the adjustment provided by the screws that are positioned outwardly of the bearings adjacent the accurately formed surfaces of the beam.

In the embodiment illustrated in FIGS. 9 through 12, the machine is adapted for precision drilling of printed circuit boards, although it is equally usable wherever the need may be encountered for drilling at precise locations. Mounted on the beam 53 and running lengthwise of it is a shaft 97, connected to which are rocker arms 98. Pivotally connected to the outer ends of the latter members are air cylinders 99, beneath which are rods 100 connecting to the drill assemblies 54. These units include drill motors 102, beneath which are conventional chucks 103 to hold the drills 104. The drill motors are mounted in brackets 105, which have apertured side portions that receive vertically extending ways 106. The ways, in turn, are held by brackets 107 to the surface 60 of the beam 53. Therefore, when the shaft 97 is rotated, the rocker arms 98 are caused to rotate and press downwardly on the air cylinders 99. This, through the rods 100, moves the drill assemblies 54 downwardly in the paths defined by the ways 106 so that the drilling operation can take place. Reversal of the rotation of the rocker arms 98 raises the drill assemblies 54. The vertical positions of the drills may be varied by means of the air cylinders 99, which permit either extension or retraction of the rods 100. Therefore, with the machine of this invention, several drills may be carried by the side of the beam and caused to advance along the path defined by the beam to drill openings in a precise line as established by the accurately formed surface 59 of the beam.

Figure 13:
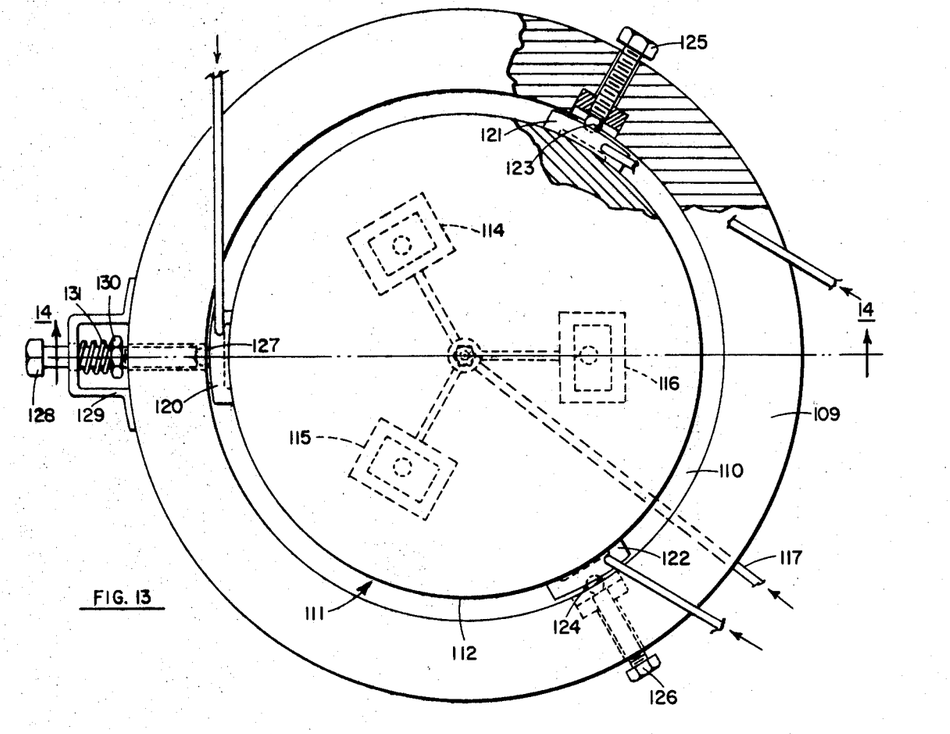
FIG. 13 is a plan view, partially broken away, of the invention as used in a rotary machine.
Figure 14:
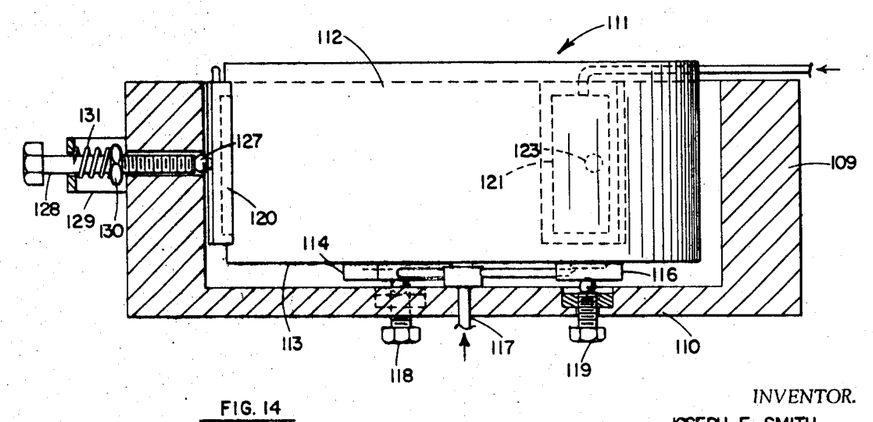
FIG. 14 is a transverse sectional view taken along line 14-14 of FIG. 13.

As shown in FIGS. 13 and 14, the invention is applied to the mounting of a rotary device. In this connection, it is useful wherever precision rotational movement may be needed, such as for a gun mount, telescope or antenna. The device includes a housing having a cylindrical wall 109 and a bottom end wall 110. The upper end of the housing is open. Within the housing is the device 111 which is to be rotatably mounted. It includes a cylindrical wall 112 and a radial flat bottom wall 113. The latter surface is supported on a suitable number of air bearings, such as the three bearings 114, 115 and 116 in the device illustrated. These are supplied by an air line 117. The bearings 114, 115 and 116 may be mounted approximately for adjustment as were the previously described bearings, having ball-and-socket joints at their outer surfaces and carried at the ends of screws that may be rotated to move them upwardly or downwardly. The adjustment screws 118 and 119 for the bearings 114 and 116 may be seen in FIG. 14.

The cylindrical sidewall 112 of the member 111 is engaged by three identical bearings 120, 121 and 122, which are equally spaced apart. These bearings have inner surfaces which are recessed generally as the bearings described above, but which at their peripheries are complementary to the cylindrical exterior of the device 11 presented by the wall 112. Balls 123 and 124 engage the outer sides of the bearings 121 and 122, and also the ends of adjustment screws 125 and 126. Thus, the bearings 121 and 122 may be adjusted inwardly and outwardly, but during operation of the device are maintained in a fixed position.

The bearing 120 is spring loaded in a manner similar to the bearing 61 at the upper side 57 of the beam 53. There is a ball 127 at the outer side of the bearing 120 engaged by a screw 128, which extends through a cage 129 where, through a nut 130, it is loaded by a spring 131. The spring 131, therefore, pushes inwardly on the screw 128 and, in turn, holds the bearing 120 against the side 112 of the member 111. The spring-mounted bearing 120 compensates for irregularities in contour and alignment of the surface 112 as the device 111 is rotated. This design differs from those utilizing a straight beam in having only a single surface to be engaged by both the fixed and spring-loaded bearings.

I claim:

1. An arrangement for providing precision movement comprising
    a first member,
    a second member,
        said first and second members being movable relative to each other,
        said first member having a first surface and a second surface substantially opposite from said first surface,
        said first surface relatively closely conforming to a predetermined contour,
        said second surface relatively approximating but not entirely conforming to said predetermined contour,
        said second surface being approximately but not entirely parallel to said first surface,
    a first bearing means,
    a first connecting means for said first bearing means and said second member for positioning said first bearing means adjacent said first surface in a fixed position for following said first surface upon relative movement of said first and second members,
    a second bearing means,
    and a second connecting means for said second bearing means and said second member for positioning said second bearing means adjacent said second surface for following said second surface upon relative movement of said first and second members,
        said second connecting means including resilient means for allowing movement of said second bearing means relative to said second member in response to deviations of said second surface from said predetermined contour upon said relative movement of said first member and said second member.

2. A device as recited in claim 1 in which said first and second bearing means comprise air bearings.

3. A device as recited in claim 2 in which each of said air bearings includes a member having a surface provided with a relatively shallow central recess, and passage means communicating with said recess for conducting air under pressure thereto.

4. A device as recited in claim 2 in which
    said first connecting means includes a first universal joint means for said first bearing means,
    and said second connecting means includes a second universal joint means for said second bearing means,
    for thereby allowing universal movement of said first and second bearing means.

5. A device as recited in claim 4 in which said universal joint means include ball-and-socket assemblies for said first and second bearing means.

6. A device as recited in claim 4 in which said first connecting means includes adjustable means for controlling said fixed position of said first bearing means in a direction normal to said first surface.

7. A device as recited in claim 4 in which said first bearing means includes a first pair of laterally spaced bearings.

8. A device as recited in claim 7 in which said first connecting means includes adjustable means engaging each of the bearings of said first pair of laterally spaced bearings for individually controlling the position of each of the bearings of said first pair of laterally spaced bearings in a direction normal to said first surface.

9. A device as recited in claim 8 in which said adjustable means includes a duality of threaded members threadably engaging said second member and positioned one adjacent either of said bearings of said first pair of laterally spaced bearings, said first universal joint means including a ball-and-socket joint interposed between either of said threaded members and the adjacent bearing of said first pair of laterally spaced bearings.

10. A device as recited in claim 4 in which said second bearing means includes a second pair of laterally spaced bearings.

11. A device as recited in claim 10 in which
    said second connecting means includes a resilient bar for providing said resilient means,
    said second universal joint means including a ball-and-socket joint between said resilient bar and each of the bearings of said second pair of laterally spaced bearings,
    and an additional ball-and-socket joint between said resilient bar and said second member,
    said additional ball-and-socket joint being positioned intermediate said first-mentioned ball-and-socket joints.

12. A device as recited in claim 11 in which said second connecting means includes adjustable means engaging said additional ball-and-socket joint for controlling the position of said resilient bar in a direction normal to said second surface.

13. A device as recited in claim 10 in which said second connecting means includes
    a substantially rigid bar,
    said second universal joint means including a ball-and-socket joint between said substantially rigid bar and each of the bearings of said second pair of laterally spaced bearings,
    an additional ball-and-socket joint intermediate said first-mentioned ball-and-socket joints,
    for providing said second universal joint means,
    a member engaging said additional ball-and-socket joint,
    and a spring biasing said member toward said bar,
    for thereby providing said resilient means.

14. A device for providing precise linear movement comprising
    a structure,
    an elongated beam movable longitudinally relative to said structure,
        said beam having a first sidewall relatively closely conforming to a planar contour,
        and having a second and opposite sidewall relatively approximating a planar contour and approximately parallel to said first sidewall,
        and having top and bottom walls,
    a duality of first spaced bearing assemblies for guiding said beam during said movement,
        each of said first bearing assemblies including a first pair of air bearings,
        said first air bearing being disposed one above the other,
    a first connecting means interconnecting each of said first air bearing assemblies and said structure,
        said first connecting means including a first universal joint means for each of said first air bearings for allowing angular movement of each of said first air bearings, said first connecting means further including adjustable means for holding said first pair of air bearings adjacent said first sidewall, so that each of said first air bearings is in a fixed position, and for controlling said fixed position of each of said first air bearings in a direction normal to said first sidewall, a duality of spaced second bearing assemblies,
 each of said second bearing assemblies including a second pair of air bearings adjacent said second sidewall,
 said second air bearings being disposed one above the other,
a second connecting means interconnecting each of said second air bearing assemblies and said structure,
 said second connecting means including a universal joint means for each of said second air bearings for allowing angular movement of each of said second air bearings,
 and resilient means biasing said second air bearings toward said second sidewall,
a duality of third air bearing assemblies adjacent said top wall,
a third connecting means interconnecting said third air bearing assemblies and said structure,
a duality of fourth bearing assemblies adjacent said bottom wall,
and a fourth connecting means interconnecting said fourth air bearing assemblies and said structure.

15. A device as recited in claim 14 in which each of said universal joint means includes a ball-and-socket joint for each of said air bearings.

16. A device as recited in claim 14 in which
said first connecting means includes a threaded member adjacent each of said first air bearings,
 said threaded members being substantially normal to said first sidewall and threadably engaging said structure,
and said first connecting means includes a ball-and-socket joint between each of said threaded members and the adjacent first air bearing,
whereby said threaded members are movable axially upon rotation thereof and provide said adjustable means, and said ball-and-socket joints form said first universal joint means.

17. A device as recited in claim 14 in which
said resilient means includes
 a bar adjacent said second air bearings,
 and a spring biasing said bar toward said second sidewall,
and said universal joint means includes
 a universal joint between either of said second air bearings and said bar,
 and an additional universal joint intermediate said first-mentioned universal joints, and between said bar and said spring.

18. A device for providing precise rotational movement comprising
a first member,
a second member,
 said first and second members being relatively rotatable,
 said second member having a cylindrical surface,
at least three air bearings spaced around the periphery of said second member adjacent said cylindrical surface,
means rigidly interconnecting two of said bearings and said first member,
resilient means interconnecting the third of said bearings and said first member for allowing movement of said third bearing during relative rotation of said first and second members in response to irregularities on said cylindrical surface,
universal joint means between said third bearing and said resilient means,
and universal joint means between each of said two bearings and said means interconnecting said two bearings and said first member.

19. A device as recited in claim 18 in which said means for rigidly interconnecting said two bearings and said first member includes adjustable means for permitting the positions of said two bearings to be adjusted radially with respect to said cylindrical surface.